Feb. 18, 1969 N. ALFERIEFF 3,428,747

MAN TO MACHINE COMMUNICATION KEYBOARD DEVICE

Filed March 22, 1965 Sheet 1 of 4

INVENTOR
Nicholas Alferieff
BY Flynn, Marn
& Jangarathis
ATTORNEYS

Feb. 18, 1969 N. ALFERIEFF 3,428,747

MAN TO MACHINE COMMUNICATION KEYBOARD DEVICE

Filed March 22, 1965 Sheet 2 of 4

INVENTOR
Nicholas Alferieff
BY Flynn, Marn
& Jangarathis
ATTORNEYS

INVENTOR
Nicholas Alferieff
BY Flynn, Marn & Jangarathis
ATTORNEYS

Feb. 18, 1969 N. ALFERIEFF 3,428,747

MAN TO MACHINE COMMUNICATION KEYBOARD DEVICE

Filed March 22, 1965 Sheet 4 of 4

INVENTOR
Nicholas Alferieff
*Flynn, Marn & Jangarathis*
ATTORNEYS

United States Patent Office 3,428,747
Patented Feb. 18, 1969

3,428,747

MAN TO MACHINE COMMUNICATION KEYBOARD DEVICE

Nicholas Alferieff, 38 Cross Ridge Road, Chappaqua, N.Y. 10514

Filed Mar. 22, 1965, Ser. No. 441,704

U.S Cl. 178—17 38 Claims

Int. Cl. H041 *15/12, 15/16*

ABSTRACT OF THE DISCLOSURE

A communication device comprised of a support enclosure having an array of a plurality of key-units and of an auxiliary unit containing a converter, a decoder and a recording device. The key units are comprised of two or three keys which are operated by a single human digit which will generate diverse numbers of signals depending upon the manner in which the keys are actuated. In the preferred embodiment, the communication device is provided with two arrays of five key units which are interconnected by the signal generation and transmission system to permit $282\times10^6$ discrete unambiguous signals to be produced with the eight fingers and two thumbs of the human hands to produce limitedly and simultaneously several elements of human speech either in the conventionally spelled form or in its natural phonetic form, but in both cases permitting the transmission of whole words by a single stroke.

This invention relates to man-machine communication devices, and more particularly relates to a keyboard device of substantial capacity, relative ease of operation, and compact form, adapted to operation by sequential or simultaneous use of the fingers of both hands, and so organized that a minimum of digital movement within the normal orbits of movement of the fingers, and thumbs, is required.

The most important keyboard devices in present use are: the typewriter, the stenotype machine, and the "key-punch" machine.

All of the above provide, in one way or another, the actuation of a type-bar or punch by the striking of a key, the impetus of the finger being amplified, in the case of the electric typewriter, by electrical means. These machines may be further classified in their mode of operation, since the typewriter sequentially spells, the stenotype simultaneously records several symbols in a semi-coded output, while the key-punch gives a sequential coded output. All are "contact devices," in that they are not so organized as to be remotely controlled.

There are also some keyboard devices recently developed capable of being operated remotely from a writing machine, computer, or other device for recording the output of the keyboard.

The present invention relates to this latter class.

It is an object of this invention to provide a compact keyboard device organized for convenient and rapid output of single or multiple simultaneous signals of great variety, such signals to be utilized for the recording of information, the communication of information, the actuation of devices such as computers, and the like, singly or simultaneously.

A further object of the invention is the provision of a keyboard device utilizing the normal position or posture of the human hand, and actuated by movements of minimal dimension therefrom.

A still further object of this invention is the provision of such a communication device capable of transmitting information without ambiguities while utilizing minimal strokes of the keys, and also capable of greatly extended and efficient utilization of mnemonic aids.

In order to analyze the competence of the present invention and to assign it a place comparative to other devices of the art, it is necessary to define certain terms and concepts as follows:

(a) set of parallel codes
(b) coding cycle
(c) serial coding
(d) stroke
(e) simultaneous representation of serial codes
(f) coding ambiguities
(g) finger displacement between strokes A set of parallel codes is a list of all different codes in a given system, such as, for example, all letters of an alphabet, punctuation marks, digits, etc., used in the coding of a language.

A coding cycle consists of selecting and recording one code member from all members of a given set of parallel codes.

Serial coding consists of sequential repetition of coding cycles, such as, for example, the typing of letters representing a word.

A stroke is the depressing of one or several keys, singly, as with a typewriter, or simultaneously, as with a stenotype, or other machine where several letters in series may be registered simultaneously.

Coding ambiguities occur when a coding system has multi-key codes, i.e., codes requiring the depression of several keys simultaneously, but has no provision for differentiating between these multi-key codes and the clusters of single-key codes.

An example of such an ambiguity is as follows:

Key #1 represents letter L
Key #2 represents letter M
Keys #1 and #2, struck simultaneously, represent the code for Letter T In such a system, keys 1 and 2, struck simultaneously, can represent either the letter T or the digraph LM, and the resulting ambiguity can be resolved only by resort to the surrounding context.

Such ambiguities may be tolerated when the output of the recording machine is not final and requires deciphering and further recording, as with a stenotype machine. But no ambiguities can be tolerated in any system where the output is final as with a typewriter, or in any system involving the actuation of a mechanism such as a computer.

The displacement, or movement of the fingers to accomplish a stroke, and to pass to a position of rest or to another stroke is a major factor in the speed of operation of a keyboard device, the minimal motions conferring the greater speed.

A typewriter permits only one coding cycle per stroke, gives a non-ambiguous output, and requires on the average displacement of about ¾ inch laterally and about 2½ inches longitudinally. The usual speed range is between 60 words per minute and 120 words per minute.

A stenotype device permits, on the average, 1.77 coding cycles per stroke, has an output which can be ambiguous, and finger displacements about the same laterally, but considerably shorter longitudinally than the typewriter.

The presently described device permits five coding cycles per stroke, with a non-ambiguous output. It requires displacements not exceeding approximately ⅜ inch laterally and ¾ inch longitudinally. It positions the hand in a natural gripping configuration, and its capability of speed may be estimated at between 250 and 750 words per minute.

The operational characteristics of the presently described device may be summarized, in comparison with common keyboard devices, as follows:

| | Typewriter | Stenotype | Present invention |
|---|---|---|---|
| Coding cycles per stroke | 1.0 | 1.77 | 5.0 |
| Ambiguous output | No | Yes | No |
| Maximum displacement of fingers, lateral (in.) | ¾ | ¾ | ⅛ |
| Maximum displacement of fingers, longitudinal (in.) | 2½ | 1⅛ | ¾ |
| Number of available unambiguous codes per stroke | 48 | 53,770 | $282\times10^6$ |
| Operational speed, words per minute | 60/120 | 120/300 | 250/750 |

The keyboard of this invention is adequately shown in the drawings, in which.

Figure 1:
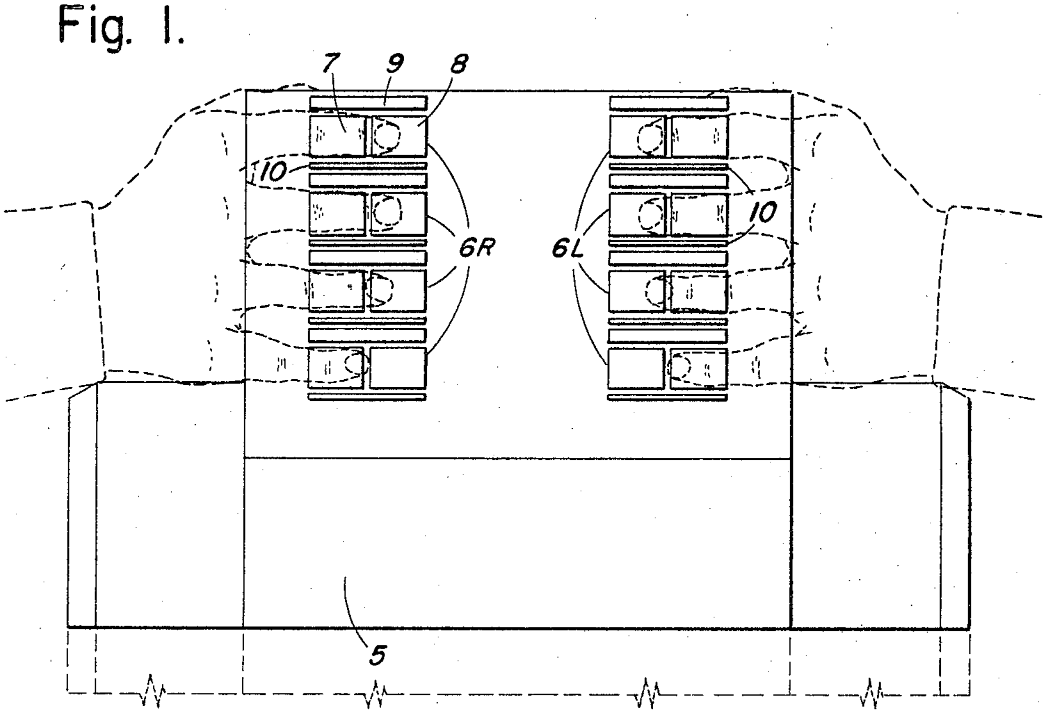
FIGURE 1 shows an elevation view of the front, or finger side of the device.

In FIGURE 1, the keyboard device is seen to comprise a body 5, with eight horizontal rows of keys divided into eight key-units of three keys, four of such key-units (6R) for right hand operation, and four of such key-units (6L) for left hand operation, the positioning of the hands and fingers thereof being as shown by dotted lines. Each of the eight key-units has three keys, designated (in only one key-unit for clarity) 7, 8 and 9. All key-units are similarly equipped. Keys 7 and 8 have relatively broad, flat surfaces, and key 9 is formed as an elongated ridge extending the length of 7 and 8 together and extended somewhat above the plane of the surface of keys 7 and 8. It will be noted from this drawing that the finger displacement necessary to move from key is minimal, that accidental simultaneous depression of key 9 can be readily avoided, while intentional simultaneous depression of 9 and 7, 8, either or both, can be done with equal ease. Between each of the key-units, 6R and 6L, there is provided a divider 10, which serves as divider, positioner, or finger rest. The divider 10 is removable in the event that the keyboard device is being used by an expert.

Figure 2:
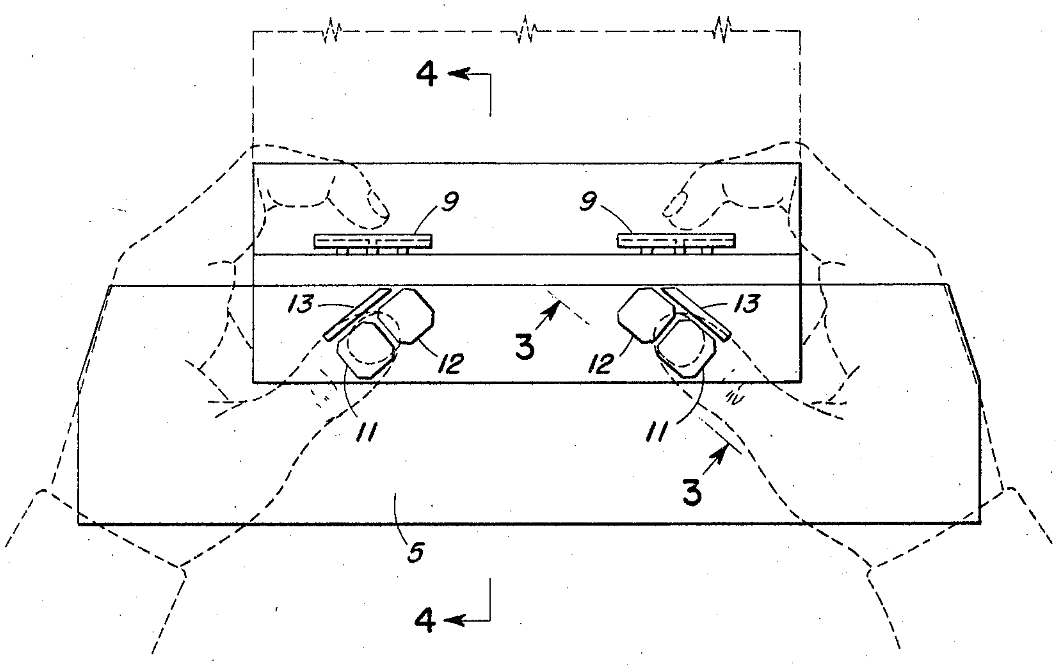
FIGURE 2 shows a vertical view of the device.

FIGURE 2 is vertical view, showing once again the body 5, the uppermost keys 9—9 of the key-units, the paired thumb-operated keys 11, 12, 13 and 11, 12, 13. As in the finger key-units there were two rather broad-faced keys and a ridge key, so in each thumb-unit there are two broad-faced keys 11 and 12, and a ridge key 13. The view of FIGURE 2 also shows how, in two handed operation, the keyboard device may be held quite comfortably in a natural, somewhat accordion-like position.

Figure 3:
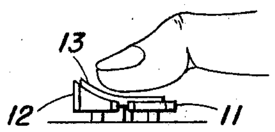
FIGURE 3 is a detailed view of the thumb position.

FIGURE 3 is a semi-sectional view or side view of a single thumb key-unit, showing the natural position of the thumb, and also showing that it may be preferred to add a curve to the surface of keys 12 and 13 for greater operational ease and accuracy of position.

Figure 4:
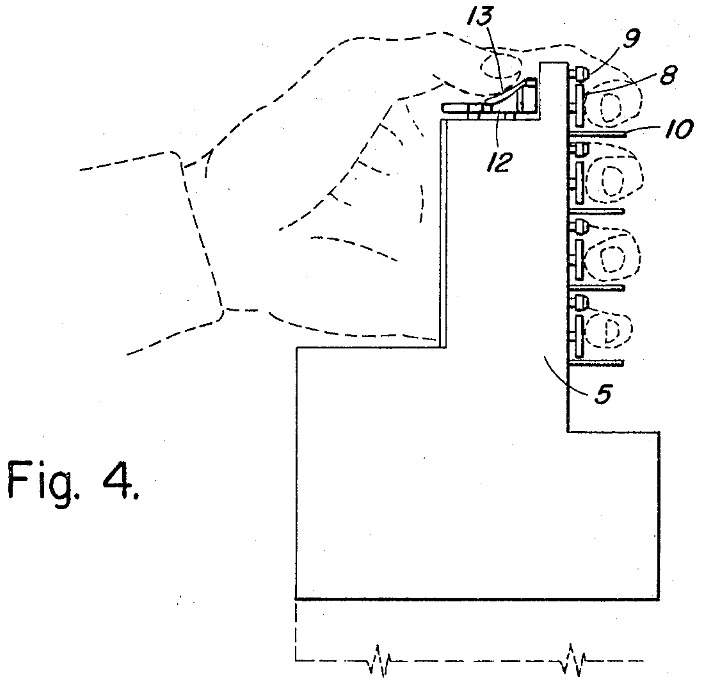
FIGURE 4 is a partially sectional view showing the positioning of a single hand.

FIGURE 4 is a partial sectional view showing in detail the arrangement and positioning vertically of the several finger key-units and the thumb key-unit, the left hand being shown, with thumb keys 11, 12, 13 and finger keys 9 and 8 (7 being behind 8), dividers 10, and body 5.

Figure 5:
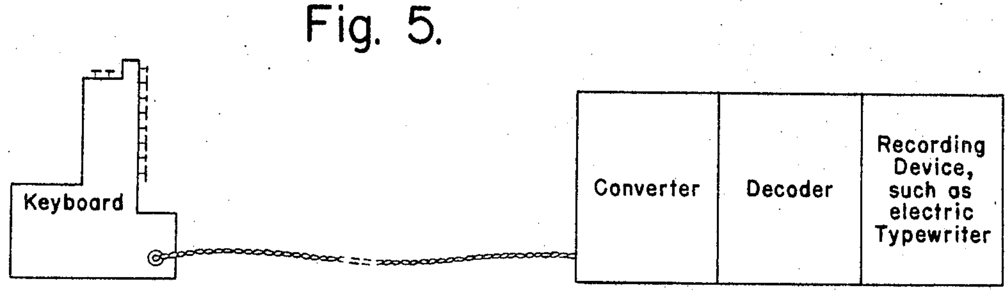
FIGURES 5 and 6 are schematic representations of a remote mode of operation of the keyboard, with the optional use of radio signals.
Figure 6:
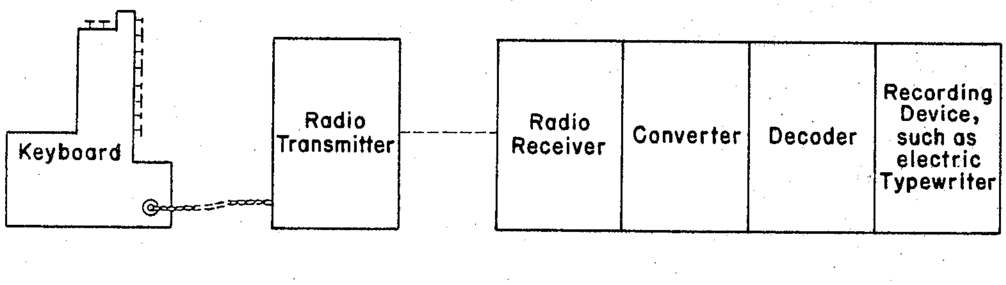

FIGURES 5 and 6 schematically illustrate remote station techniques whereby the keyboard unit can be located at any desired distance from the converting and deciphering devices, used for appropriate processing of the signals, before they enter the recording machine. In FIGURE 6 the chain of signal transmission includes the transmission and the receiving of radio signals.

Figure 7:
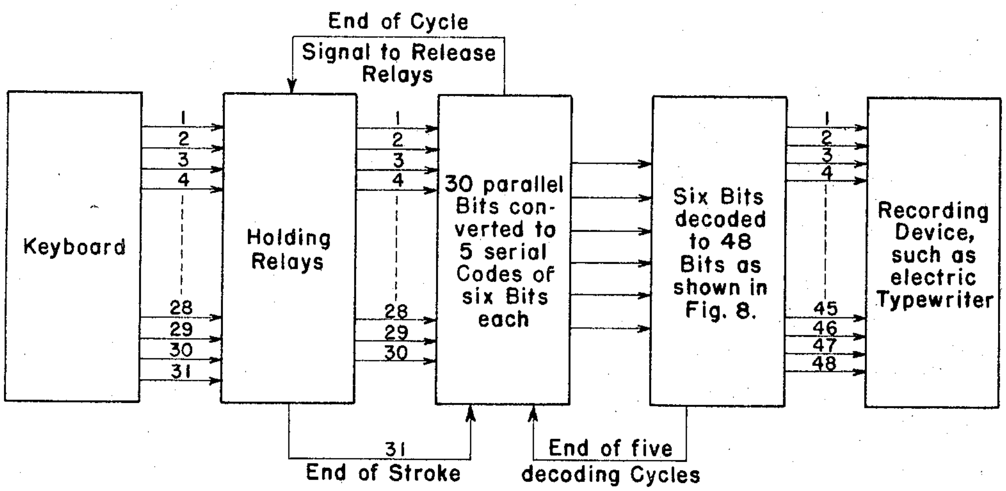
FIGURE 7 is a system diagram for the conversion and the deciphering of the keyboard output into symbols suitable for the input in the recording machine.

FIGURE 7 shows schematically the flow of parallel signals originating in the keyboard in one stroke, with their subsequent conversion into five serial codes, and the deciphering of each of these serial codes into symbols suitable for input into a recording machine.

Figure 8:
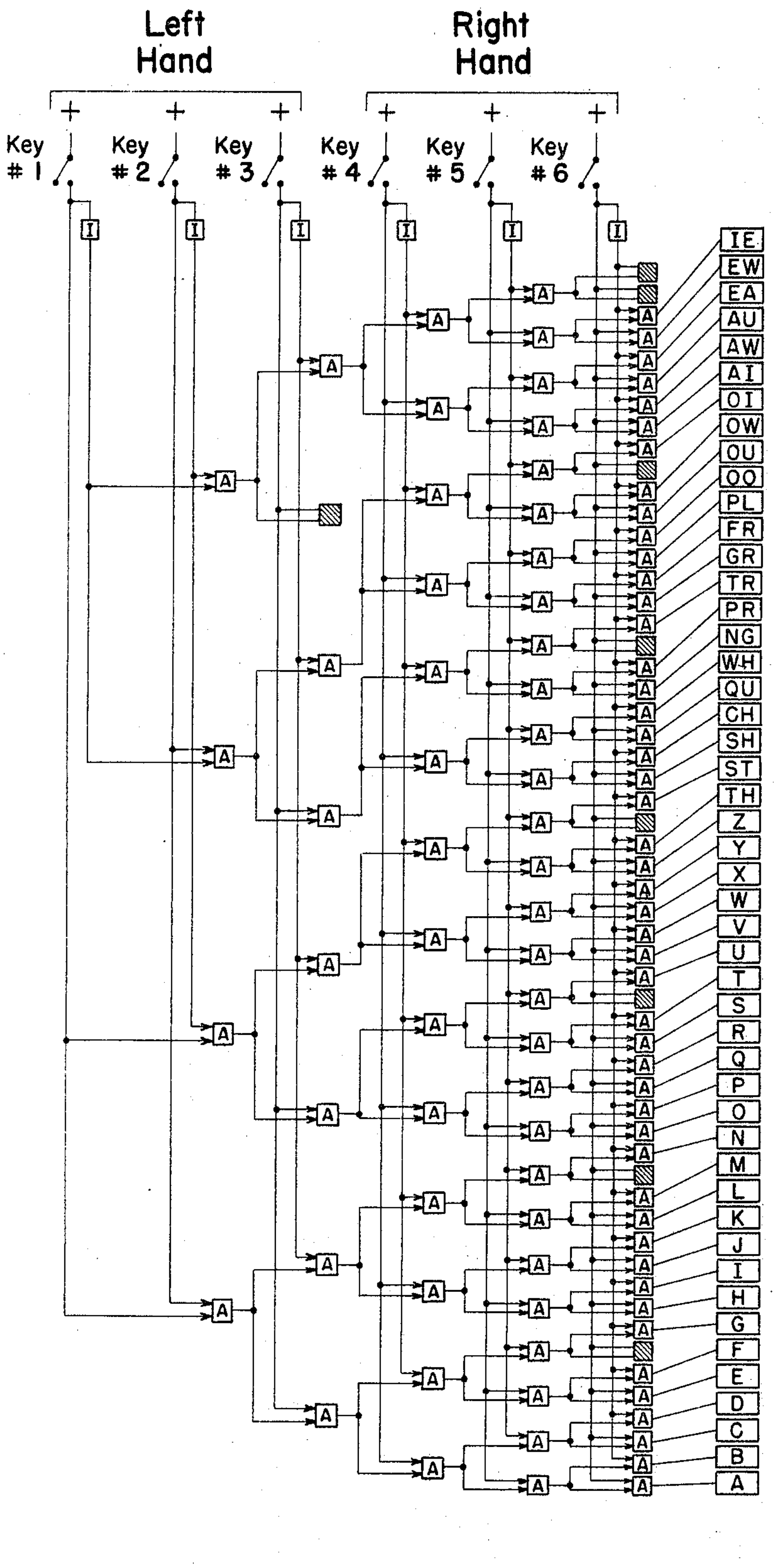
FIGURE 8 is a schematic wiring diagram, showing the switching and signal transmission arrangements for two cooperating key-units.

In FIGURE 8 there is shown in schematic form the switching and signal transmission arrangements for two cooperating key-units, say, for example, of the two index fingers. In this FIGURE 8, keys #1, #2 and #3 are the three keys of one key-unit, key #3 being the key which is inoperative by itself. Similarly, keys #4, #5 and #6 are keys of the second key-unit, key #6 being the key inoperative by itself. The various shaded squares show inoperative junctions, and the lettered squares at the bottom indicate the code achieved, each exemplified, in this case by a letter character or a digraph capable of being recorded by a writing machine.

It will be noted that in the discussion of these several views and in the views themselves, little attention has been paid to body 5. That is because except for that vertical portion immediately adjacent to and supporting the finger key-units and the thumb key-units, its form and size is optional, since its function is to support and house the switching mechanisms operated by the keys. These switching arrangements will be of conventional types, and their set-up and installation will be well within the skill of those competent in such art.

It is necessary, however, that before the output of the keyboard is fed into the recording machine (such as an electric typewriter), a cooperation is arranged between the various keys and circuits as hereinafter described.

Consider a single finger key-unit with keys 7, 8, 9, (all finger key-units being the same), key 9 either cannot be depressed by itself, or is arranged to actuate nothing when so depressed (see FIGURE 8). Keys 7, 8 may be depressed singly; or either key 7 or 8 simultaneously with key 9; or both key 7 and key 8 together; or keys 7, 8, and 9 (all three) simultaneously. This permits each finger to record any of seven different codes, as shown in Table I.

TABLE I

| Key #7 | Key #8 | Key #9 |
|---|---|---|
| 7 | 0 | 0 |
| 0 | 8 | 0 |
| 7 | 8 | 0 |
| 7 | 0 | 9 |
| 0 | 8 | 9 |
| 7 | 8 | 9 |
| 0 | 0 | 0 |

The corresponding fingers of both hands, i.e., index-index, etc., will be arranged as a pair, each acting as a coding unit to multiply the output of the other, giving as their combined output one set of forty-nine parallel codes, as will be evident. So, disregarding the 000000 code, the total available codes for each pair of fingers is 48.

Consequently, when this keyboard is connected to a printing mechanism in a known manner, one pair of corresponding fingers of both hands will have the power to record in one stroke one of the twenty-six letters of the alphabet or one of the twenty-two most frequently occurring digraphs, such as TH, ST, SH, CH, WH, QU, NG, PR, TR, GR, FR, PL, OO, OU, OW, OI, AI, AW, AU, EA, EW, IE.

Alternatively, a pair of fingers will have the power to record in one stroke one of the forty-six phonemes of the English language or one of two additional symbols. This compact representation of phonemes permits an entirely new technique of "stenotyping."

So far, no mention has been made of the thumbs. Since each thumb is provided with three keys exactly similar in function to those provided for each finger, a further expansion of the coding is possible with a single stroke, which stroke contemplates the actuation of one to three keys in any key-units with keys similarly selected in any other key-unit modified by appropriate actuation of selected key or keys with the other hand.

It follows that the four pairs of fingers and the two thumbs of human hands will have the power to record in one stroke a string of any five sequential symbols or digraphs, each of which is a member of a given set of 48 different symbols or digraphs. In addition to this there is one inactive position for each pair of fingers providing the ability to generate 49 basic signals per pair of fingers.

Consequently, the total number of different codes available for the representation in one stroke of letters, words, phrases of strings of up to five sequential letters or digraphs, or of phonemes, or strings of phonemes, will be $49^5$ minus 1, or 282,475,248. This represents the permutation of 245 codes divided into five classes.

With this amplitude of codes, complete elimination of ambitguities can be achieved with ease by limiting the output of each pair of fingers to one letter or to a digraph for which a code has been provided. Thus a multiple key code will always have but one translation. A corresponding cluster of single key codes will be represented obligatorily by two or more pairs of corresponding fingers.

For example, assume that key 7 represents letter N and key 8 represents letter M, while 7 and 8 together represent a code for letter F.

In this case, keys 7 and 8 when struck together have one and only one translation, viz. letter F, since the digraph NM is represented by keys in other, different, horizontal rows.

While I have described the keyboard device having keys which are depressed in operation, it is understood that the keys may be designed to generate a signal by touching of the keys.

It will also be realized that with this great number of codes without possibilities of ambiguity, the keyboard could be used for the presentation of data for computation, for purposes of classification, and for many similar uses now denied because of lack of speed, possibility of error, and the like. Many of such uses will require the devising of mnemonic systems, which systems can be both more extensive and more flexible than those now employed with less capable devices of similar kind.

In summation, it will be perceived that there is provided a keyboard instrument of infinite flexibility and scope, designed for comfortable and easy operation, having inherent capability of speed and accuracy. The basic unit of this keyboard is a unit of three keys, one of which is not operable without operation of one or both of the other two, and the further combination of one such basic unit with a second similar unit, whereby the output of the first may be further modified, and the following provision of a plurality of similar units, up to five to a side, the output of each being capable of being modified by the output of a selected unit in the opposite array.

In FIGURE 1 and FIGURE 2 there is illustrated a modified keyboard which dispenses with the elongated ridge-formed keys 9 and 13.

Figure 10:
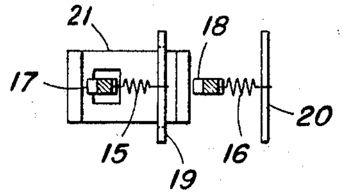
FIGURE 10 is a top view of FIGURE 9 taken through lines 10—10 of FIGURE 9.
Figure 9:
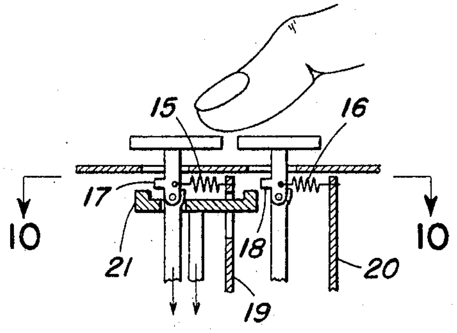
FIGURE 9 is a partial schematic side view of another embodiment of my invention.

In this embodiment of the invention the functions of the ridge key are performed by a slanting depression of two keys, either of which can be depressed straight down or with a combined motion in two directions, down and forward, producing a resultant movement at an angle to the vertical, as is readily seen by reference to FIGURES 9 and 10.

The forward movement of the keys is counterbalanced by springs 15 and 16, connected to stationary supports 19 and 20. For codes involving the eliminated ridge key, the operator exerts sufficient pressure in forward direction to overcome the resistance of the springs 15 and 16. The slanting movement of the keys causes spurs 17 and 18 to activate switch 21, which performs the functions of the eliminated ridge key. The tension of springs 15 and 16 is adjustable. In all other respects this modified embodiment of the invention functions similarly to the preferred embodiment of the invention.

While this modified embodiment requires more finger dexterity on the part of the operator, it has the advantage of further reducing the movement of fingers between strokes. No lateral displacement of fingers takes place with this keyboard, whereas the preferred embodiment of the invention requires a maximum lateral displacement of ⅜", and the typewriter and the stenotype machine require corresponding displacement of ¾".

Still another embodiment of the invention eliminates the ridge keys, as well as the functions performed by these keys. The result is a less powerful apparatus, but one which is easier to operate. In this embodiment each key unit, operated by a finger or a thumb, consists of two keys, capable of moving only in one direction, straight down, or capable of being activated by touch. The number of different signals per key unit is three (key #1, key #2, and keys #1 and #2 together) and one non-operative position, giving four different codes per key unit. The number of signals per two complementary key units, operated by the corresponding fingers or two thumbs, is 15 and one non-operative position, giving 16 different codes per pair of key units. The total number of keys is 20.

This embodiment of the invention can be operated in four different modes, as hereinafter described.

(a) Fifteen (15) signals produced by the pair of index fingers, plus 15 signals produced by the pair of middle fingers, plus three signals produced by the right thumb, make a set of 33 different parallel signals. Similarly, the signals produced by the ring fingers, the little fingers and the left thumb, make a second set of 33 different parallel signals. This mode can record simultaneously two cycles of 33 different parallel symbols.

(b) Thirty (30) signals produced by index fingers and middle fingers are modified by four signals produced by the right thumb, giving a set of 120 different parallel signals. Similarly, 30 signals produced by ring fingers and little fingers are modified by four signals produced by the left thumb, giving a second set of 120 different parallel signals. In this mode the signals produced by the fingers are modified by the signals produced by the thumbs. This mode can record simultaneously two cycles of 120 different parallel symbols.

(c) In the third mode, 15 signals produced by the index fingers are modified by two signals produced by key #1 operated by the right thumb, giving a set of 30 different parallel signals; similarly 15 signals produced by the middle fingers are modified by two signals produced by key #2 operated by the right thumb, giving a second set of 30 different parallel signals, similarly, 15 signals produced by the ring fingers are modified by two signals produced by key #1 operated by the left thumb, giving a third set of 30 different parallel signals; similarly, 15 signals produced by the little fingers are modified by two signals produced by key #2 operated by the left thumb, giving a fourth set of 30 different parallel signals. This mode can record simultaneously four sets of 30 different parallel symbols.

(d) This system is used for recording simultaneously five sets of 15 different parallel signals, produced by four pairs of fingers and the pair of thumbs. Adding the non-operative position of the keys, each set consists of 16 different parallel signals, and the total number of discrete unambiguous signals which may be generated in one stroke is 1,048,575. This system may be adapted to the recording of the numerical data, in which case all numbers consisting of up to five digits or symbols could be recorded in one stroke.

While the invention has been described in detail according to a preferred apparatus for carrying out the invention, it will be obvious to those skilled in the art that changes and modification may be made, without departing from the spirit or scope of the invention, and it is intended in the appended claims to cover such changes and modifications.

I claim:

1. In a man-to-machine communication device, a key unit to be operated by a single human digit comprising three keys and connected therewith a signal generating and transmission means responsive to selective actuation of said keys to generate and transmit a signal when either of two said keys is separately actuated, a third signal when both are actuated simultaneously, no signal when the third key is actuated alone, fourth and fifth signals when the third key is actuated simultaneously with either of the first two keys, a sixth signal when all three are actuated together, and a seventh signal corresponding to the non-active position of all three keys.

2. The communication device defined in claim 1 wherein said keys generate a signal by selective depression thereof.

3. The communication device defined in claim 1 wherein said keys generate a signal by selective touch thereof.

4. The communication device defined in claim 1 wherein the signal generating and transmission means of one key-unit is connected to the signal generating and transmission means of a second key-unit, thereby enabling a signal generated in the second unit to modify a signal generated in the first unit to give a combined capacity of 48 active signals and one non-active position.

5. In a man-to-machine communication device, an array of plurality of the key-units of claim 1, and a second array of such key-units, the key-units of said arrays being so interconnected by their signal generation and transmission means as to permit signals generated at any point in the second array to modify a signal simultaneously generated at any point in the first array.

6. In a man-to-machine communication device, an array of five of the key-units of claim 1, and a second array of five of the said key-units, the signal generation and transmission means of the second array being so interconnected by their signal generation and transmission means with the corresponding systems of the first array as to permit a signal generated at any point in the second array to modify a signal simultaneously generated at any point in the corresponding system in the first array, whereby, with the eight fingers and two thumbs of the human hands there may be generated over $282\times10^6$ discrete unambiguous signals.

7. In a man-to-machine communication device, an array of five of the key units of claim 1, and a second array of five of said key-units, the signal generation and transmission means of the second array being so interconnected by their signal generation and transmission means with the corresponding means of the first array, whereby over $282\times10^6$ discrete unambiguous signals may be generated in one stroke, said arrays being arranged to generate 49 basic signals, with five variant forms for each of said 49 basic signals, the five sets of signals being placed in a sequence for the simultaneous representation of the sequential form of human speech.

8. In a man-to-machine communication device, a support-enclosure means having a vertical face and a horizontal top surface, two arrays of the key-units of claim 1 mounted upon the vertical face thereof at opposite sides of said face to be operated by the fingers of each hand, and upon the top surface two key-units positioned to be operated by the thumbs of each hand, the signal generating and transmission means associated with the key-units being partially mounted in and supported by said support enclosure.

9. In a man-to-machine communication device, the key-unit of claim 1, in which the two keys capable of individual operation are closely spaced, essentially planar topped keys resting in a space corresponding to the dimensions of the end section of a human digit, and the third key is a ridge-formed key located beside and extending along the space occupied by the two planar keys.

10. The man-to-machine communication device defined in claim 1 wherein the signal generating and transmission means of said device passes a signal to a signal converter, a decoder and a recording device.

11. The man-to-machine communication device defined in claim 1 wherein said signal generating and transmission means of said device passes a signal to a radio-transmitter, a radio receiver, a signal converter, a decoder and a recording device.

12. In a man-to-machine communication device, an array of five of the key units of claim 1, and a second array of five of the said key units, the signal generation and transmission means of the second array being so interconnected by their signal generation and transmission means with the corresponding systems of the first array as to permit a signal generated at any point in the second array to modify a signal simultaneously generated at any point in the corresponding system in the first array, whereby, with the eight fingers and two thumbs of the human hands there may be generated over $282\times10^6$ discrete unambiguous signals, the signal generation and transmission means of said device passing a signal to a signal converter, a decoder, and a recording device.

13. In a man-to-machine communication device, an array of five of the key-units of claim 1, and a second array of five of the said key-units, the signal generation and transmission means of the second array being so interconnected by their signal generation and transmission means with the corresponding systems of the first array as to permit a signal generated at any point in the second array to modify a signal simultaneously generated at any point in the corresponding system in the first array, whereby, with the eight fingers and two thumbs of the human hands there may be generated over $282\times10^6$ discrete unambiguous signals, the signal generation and transmission means of said device passing a signal to a radio-transmitter, a radio-receiver, a signal converter, a decoder and a recording device.

14. In a man-to-machine communication device, a key unit to be operated by a single human digit comprising two keys, either of said keys being capable of actuation in two different directions, one direction forming a right angle with the plane of the surface of the keyboard, and the other direction forming an oblique angle with the plane of the surface of the keyboard, the said keys being connected to a signal generating means responsive to selective actuation of said keys, acting to generate and transmit a signal when one key is actuated vertically, a second signal when the same key is actuated at an angle, a third signal when the second key is actuated vertically, a fourth signal when the second key is actuated at an angle, a fifth signal when both keys are actuated together vertically, a sixth signal when both keys are actuated together at an angle, and a seventh signal when both keys are in non-operative position.

15. The communication device defined in claim 14 wherein the signal generating and transmission means of one key-unit is connected to the signal generating and transmission means of a second key-unit, thereby enabling a signal generated in the second unit to modify a signal generated in the first unit to give a combined capacity of 48 active signals and one non-active position.

16. In a man-to-machine communication device, an array of plurality of the key-units of claim 14, and a second array of such key-units, the key-units of said arrays being so interconnected by their signal generation and transmission means as to permit signals generated at any point in the second array to modify a signal simultaneously generated at any point in the first array.

17. In a man-to-machine communication device, an array of five of the key units of claim 14, and a second array of five of said key-units, the signal generation and transmission means of the second array being so interconnected by their signal generation and transmission systems with the corresponding means of the first array as to permit the signal generated at any point in the second array to modify the signal simultaneously generated at any point in the corresponding systems in the first array, whereby, with eight fingers and two thumbs of the human hands there may be generated over $282\times10^6$ discrete unambiguous signals.

18. In a man-to-machine communication device, an array of five of the key-units of claim 14, and a second array of five of said key-units, the signal generation and transmission means of the second array being so interconnected by their signal generation and transmission means with the corresponding means of the first array, whereby over $282\times10^6$ discrete unambiguous signals may be generated in one stroke, said arrays being arranged to generate 49 basic signals, with five variant forms for each of said 49 basic signals, the five sets of signals being placed in a sequence for the simultaneous representation of the sequential form of human speech.

19. In a man-to-machine communication device, a support-enclosure means having a vertical face and a horizontal top surface, two arrays of the key-units of claim 14 mounted upon the vertical face thereof at opposite sides of said face to be operated by the fingers of each hand, and upon the top surface two key-units positioned to be operated by the thumbs of each hand, the signal generating and transmission means associated with the key-units being partially mounted in and suported by said support enclosure.

20. The man-to-machine communication device defined in claim 14 wherein the signal generating and transmission means of said device passes signals to a signal converter, a decoder and a recording device.

21. The man-to-machine communication device defined in claim 14 wherein the signal generating and transmission means of said device passes signals to a radio transmitter, a radio receiver, a signal converter, a decoder and a recording device.

22. In a man-to-machine communication device, an array of five of the key units of claim 14, and a second array of five of said key-units, the signal generation and transmission means of the second array being so interconnected by their signal generation and transmission systems with the corresponding means of the first array as to permit the signal generated at any point in the second array to modify the signal simultaneously generated at any point in the corresponding systems in the first array, whereby, with eight fingers and two thumbs of the human hands there may be generated over $282\times10^6$ discrete unambiguous signals, the signal generating and transmission means of said device passing signals to a signal converter, a decoder and a recording device.

23. In a man-to-machine communication device, an array of five of the key units of claim 14, and a second array of five of said key-units, the signal generation and transmission means of the second array being so interconnected by their signal generation and transmission systems with the corresponding means of the first array as to permit the signal generated at any point in the second array to modify the signal simultaneously generated at any point in the corresponding systems in the first array, whereby with eight fingers and two thumbs of the human hands there may be generated over $282\times10^6$ discrete unambiguous signals, the signal generating and transmission means of said device passing signals to a radio transmitter, a radio receiver, a signal converter, a decoder and a recording device.

24. In a man-to-machine communication device, a key unit to be operated by a single human digit comprising two keys and connected therewith a signal generating means responsive to selective actuation of said keys, acting to generate and transmit a signal when either of two of said keys is separately actuated, a third signal when both are actuated simultaneously, and a fourth signal when both keys are in a non-active position.

25. The communication device defined in claim 24 wherein said keys generate a signal by selective depression thereof.

26. The communication device defined in claim 24 wherein said keys generate a signal by selective touch thereof.

27. The communication device defined in claim 24 wherein the signal generating and transmission means of one key-unit is connected to the signal generating and transmission means of a second key-unit, thereby enabling a signal generated in the second unit to modify a signal generated in the first unit to give a combined capacity of 15 active signals and one non-active position.

28. In a man-to-machine communication device, an ar-array of plurality of the key-units of claim 24, and a second array of such key-units, the key units of said arrays being so interconnected by their signal generation and transmission means as to permit signals generated at any point in the second array to modify a signal simultaneously generated at any point in the first array.

29. In a man-to-machine communication device, an array of five of the key-units of claim 24, and a second array of five of said key-units, the signal generation and transmission means of the second array being so interconnected by their signal generation and transmission systems with the corresponding systems of the first array as to permit the signal generated at any point in the second array to modify the signal simultaneously generated at any point in the corresponding systems in the first array, whereby, with eight fingers and two thumbs of the human hands there may be generated over $10^6$ discrete unambiguous signals.

30. In a man-to-machine communication device, an array of five of the key-units of claim 24, and a second array of five of said key-units, the signal generation and transmission means of the second array being so interconnected by their signal generation and transmission systems with the corresponding systems of the first array as to permit the signal generated at any point in the second array to modify the signal simultaneously generated at any point in the corresponding systems in the first array, whereby over $10^6$ discrete unambiguous signals may be generated in one stroke, said signals being arranged to record simultaneously two cycles of 33 different parallel symbols.

31. In a man-to-machine communication device, an array of five of the key-units of claim 24, and a second array of five of said key-units, the signal generation and transmission means of the second array being so interconnected by their signal generation and transmission systems with the corresponding systems of the first array as to permit the signal generated at any point in the second array to modify the signal simultaneously generated at any point in the corresponding systems in the first array, whereby over $10^6$ discrete unambiguous signals may be generated in one stroke, said signals being arranged to record simultaneously two cycles of 120 different parallel symbols.

32. In a man-to-machine communication device, an array of five of the key-units of claim 24, and a second array of five of said key-units, the signal generation and transmission means of the second array being so interconnected by their signal generation and transmission systems with the corresponding system of the first array as to permit the signal generated at any point in the second array to modify the signal simultaneously generated at any point in the corresponding systems in the first array, whereby over $10^6$ discrete unambiguous signals may be generated in one stroke, said signals being arranged to record simultaneously four cycles of thirty different parallel symbols.

33. In a man-to-machine communication device, an array of five of the key-units of claim 24, and a second array of five of said key-units, the signal generation and transmission means of the second array being so interconnected by their signal generation and transmission sysems with the corresponding systems of the first array as to permit the signal generated at any point in the second array to modify the signal simultaneously generated at any point in the corresponding systems in the first array, whereby over $10^6$ discree unambiguous signals may be generated in one stroke, said signals being arranged to record simultaneously up to five symbols of numerical data.

34. In a man-to-machine communication device, a support-enclosure means having a vertical face and a horizontal top surface, two arrays of the key-units of claim 24 mounted upon the vertical face thereof at opposite sides of said face to be operated by the fingers of each hand, and upon the top surface two key-units positioned to be operated by the thumbs of each hand, the signal generating and transmission means associated with the key-units being partially mounted in and supported by said support enclosure.

35. The man-to-machine communication device defined in claim 24 wherein the signal generating and transmission means of said device passes signals to a signal converter, a decoder and a recording device.

36. The man-to-machine communication device defined in claim 24 wherein the signal generating and transmission means of said device passes signals to a radio transmitter, a radio receiver, a signal converter, a decoder and a recording device.

37. In a man-to-machine communication device, an array of five of the key-units of claim 24, and a second array of five of said key-units, the signal generation and transmission means of the second array being so interconnected by their signal generation and transmission systems with the corresponding systems of the first array as to permit the signal generated at any point in the second array to modify the signal simultaneously generated at any point in the corresponding systems in the first array, whereby, with eight fingers and two thumbs of the human hands there may be generated over $10^6$ discrete unambiguous signals, the signal generation and transmission means of said device passing signals to a signal converter, a decoder and a recording device.

38. In a man-to-machine communication device, an array of five of the key-units of claim 24, and a second array of five of said key-units, the signal generation and transmission means of the second array being so interconnected by their signal generation and transmission systems with the corresponding systems of the first array as to permit the signal generated at any point in the second array to modify the signal simultaneously generated at any point in the corresponding systems in the first array, whereby, with eight fingers and two thumbs of the human hands there may be generated over $10^6$ discrete unambiguous signals, the signal generation and transmission means of said device passing signals to a radio transmitter, a radio receiver, a signal converter, a decoder and a recording device.

References Cited

UNITED STATES PATENTS

| | | | |
|---|---|---|---|
| 2,972,140 | 2/1961 | Hirsch | 178—101 |
| 3,022,878 | 2/1962 | Seibel et al. | 178—101 |
| 3,102,254 | 8/1963 | Levy | 178—23.1 |

THOMAS A. ROBINSON, *Primary Examiner.*

U.S. Cl. X.R.

178—23, 101; 340—365; 197—19